(12) United States Patent
Louis

(10) Patent No.: US 8,453,805 B2
(45) Date of Patent: Jun. 4, 2013

(54) AUTOMATIC SLACK ADJUSTER WITH BALL DETENT CLUTCH

(75) Inventor: John M. D. Louis, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 1203 days.

(21) Appl. No.: 12/333,950

(22) Filed: Dec. 12, 2008

(65) Prior Publication Data

US 2010/0147636 A1 Jun. 17, 2010

(51) Int. Cl.
*F16D 65/14* (2006.01)
*F16D 65/00* (2006.01)

(52) U.S. Cl.
USPC .................. 188/196 R; 188/196 V; 188/72.7; 188/79.57

(58) Field of Classification Search
USPC .............. 188/79.55, 79.56, 79.57, 72.7, 72.9, 188/196 R, 196 V, 196 BA
See application file for complete search history.

(56) References Cited

U.S. PATENT DOCUMENTS

| | | | |
|---|---|---|---|
| 2,636,578 A | 9/1947 | Swift | |
| 3,326,335 A * | 6/1967 | Billeter | 188/202 |
| 3,326,336 A * | 6/1967 | Sobol et al. | 188/202 |
| 3,921,765 A | 11/1975 | Swander, Jr. | |
| 4,380,276 A | 4/1983 | Sweet et al. | |
| 4,431,089 A * | 2/1984 | Nadas et al. | 188/196 D |
| 4,440,268 A | 4/1984 | Karlsson | |
| 5,327,999 A | 7/1994 | Nelander | |
| 5,664,647 A | 9/1997 | Edvardsson | |
| 2008/0128226 A1 * | 6/2008 | Iraschko | 188/79.55 |

FOREIGN PATENT DOCUMENTS

DE 102005041342 A1 * 11/2006

OTHER PUBLICATIONS

International Search Report mailed Dec. 23, 2009.

* cited by examiner

*Primary Examiner* — Melody Burch
(74) *Attorney, Agent, or Firm* — Crowell & Moring LLP

(57) ABSTRACT

An improved self-adjusting automatic slack adjuster for reducing slack in the brake of a vehicle is provided, in which an easily accessible external operating feature actuates a ball detent clutch to permit the automatic slack adjuster's adjustment mechanism to be readily disengaged, so as to allow smooth release and retraction of the brake linings of a vehicle brake without damage to the adjustment mechanism's components. When the torque applied to the external feature exceeds a predetermined torque, the balls of the ball detent clutch move out of their retaining detents, thereby disengaging the slack adjuster's worm shaft from the adjustment mechanism and permitting brake shoe retraction without resistance from the adjustment mechanism.

8 Claims, 4 Drawing Sheets

AUTOMATIC SLACK ADJUSTER WITH BALL DETENT CLUTCH

BACKGROUND AND SUMMARY OF THE INVENTION

The present invention relates to brakes used on, for example, commercial truck or trailer axles, and in particular to automatic slack adjusters which eliminate excess motion in a brake actuator mechanism used to apply the brake.

Over the life of the brake linings of a brake, such as a pneumatic drum brake used on commercial vehicle axles, as the brake's friction linings wear the clearance between the brake linings and their respective friction surfaces (for example, the inner surface of a brake drum) increases. This increasing clearance requires an ever-increasing range of motion from the brake actuator mechanism to move the brake linings from their rest position to the point at which the linings contact the friction surface.

It has become commonplace to include an automatic slack adjuster in the mechanical path between the brake actuator and the brake linings so as to eliminate excess lining travel slack as the brake linings wear. Such adjusters typically are: (i) located on a portion of a brake camshaft which is outside of the brake (typically splined to the camshaft); and (ii) coupled to a pushrod of a brake actuator such that when the brake actuator push rod is extended or retracted, the slack adjuster rotates about the longitudinal axis of the brake camshaft. An example of such a brake and slack adjuster arrangement is shown in FIG. 1 of U.S. Pat. No. 4,380,276. Thus, by extending or retracting the brake actuator pushrod, the slack adjuster causes the brake camshaft to rotate about its longitudinal axis, which in turn rotates a brake actuation cam affixed to the end of the brake camshaft located within the drum brake. The rotation of the cam either presses the brake linings into engagement with the brake drum inner friction surface or allows the brake linings to withdraw radially inward, away from the friction surface. Because the brake camshaft is used to rotate the cam which presses the brake linings radially outward, the brake camshaft is also known as the brake cam.

Automatic slack adjusters can be designed to transmit brake actuator force to the brake camshaft in the brake application direction with no relative motion between the adjuster and the brake camshaft. When the brake actuation force is withdrawn, if there is greater than desired distance between the brake linings and the brake drum friction surface, the slack adjuster is permitted to rotate relative to the brake camshaft an angular distance sufficient to remove some or all of this undesired slack, i.e., limiting the distance the brake linings withdraw from the brake drum friction surface so that the lining-drum clearance is maintained at a desired minimum.

Automatic slack adjusters as described above, where the slack adjuster rotates relative to the brake camshaft when the brake actuation force is withdrawn, are said to adjust on release. There is also the other category of automatic slack adjusters which rotate relative to the brake camshaft during the phase when the actuation force is applied, with no relative rotation when the actuation force is withdrawn, this category being said to Adjust on Apply.

In many automatic slack adjusters, a one-way clutch is used to accomplish the rotary adjusting movement, with a worm shaft located in the adjuster turning a worm gear (also known as a worm wheel) coupled to the brake camshaft. In one type of one-way clutch arrangement, the one-way clutch is coupled to the worm shaft through a toothed clutch or a friction clutch located coaxially with the worm shaft. A heavy coil spring or disc-spring pack biases the one-way clutch to keep it engaged so that a torque applied through the one-way clutch can turn the worm shaft. The worm shaft turns the worm wheel, which is coupled to brake camshaft, in order to decrease the brake lining clearance and thus compensate for lining wear. Examples of such arrangements are shown in prior art FIGS. 1-3, corresponding respectively to FIG. 4 of U.S. Pat. No. 4,380,276 (toothed clutch teeth 63), FIG. 3 of U.S. Pat. No. 5,327,999 (toothed clutch 8), and FIG. 1 of U.S. Pat. No. 5,664,647 (toothed clutch 14).

A further type of one-way clutch is a ratchet and pawl arrangement, in which a pawl has to be manually retracted to retract the brake linings. This design has the problem that if the operator does not remember to retract the pawl when manually servicing the brake, an attempt to retract the brake linings can result in damage to the one-way clutch.

Regardless of the type of automatic slack adjuster, typically an external extension of the worm shaft projects outside the automatic slack adjuster housing to permit manual brake lining clearance adjustment during the installation of the slack adjuster or of new brake linings (in FIG. 1, extension 57; in FIG. 2, extension 4'; in FIG. 3, extension 15). The extension usually is shaped as a square or hexagon to facilitate gripping and turning with a wrench or other tool. In order to advance the brake lining, the worm shaft must be rotated in a first direction (designated the clockwise direction for the purpose of this description). In order to retract the brake lining, the worm shaft must be rotated in the opposite, or counter-clockwise, direction.

When the external extension is rotated in the clockwise (advance) direction, the toothed clutch remains engaged, and the worm shaft rotates with little resistance from the one-way clutch permitting the worm shaft to rotate with little resistance. When the external extension is rotated in the counter-clockwise (retracting) direction, the one-way clutch is rotated in its "lock-up" direction, and therefore the toothed clutch coupling strongly resists rotation of the worm shaft. The strong resistance requires application of high torque loads to the external extension, up to the point at which the toothed clutch begins to slip, disconnecting the one-way clutch from the worm shaft.

The slipping of the toothed clutch in response to the application of a large torque to the external extension often results in damage to the one-way slack adjuster, for example, in the case of toothed adjusters mounted on the worm shaft, the undesired blunting of the teeth in the clutch. As these clutch teeth wear, the torque capacity of the automatic slack adjuster decreases, progressively reducing the useful service life of the automatic slack adjuster. Attempts have been made to reduce this undesired deterioration of the clutch teeth, for example, by altering the angle of the clutch teeth or rounding the tips of the teeth as shown in prior art FIGS. 4a-4b, corresponding to FIGS. 3-4 of U.S. Pat. No. 5,664,647. However, these slight teeth geometry changes have not been fully successful in addressing the wear concerns.

In view of the foregoing, it is an objective of the present invention to provide an improved automatic slack adjuster with superior manual adjustment provisions. In addressing these and other objectives, the present invention provides a solution to the problems of the prior art by providing for controlled disengagement of the one-way clutch teeth to permit withdrawal of brake shoes as an external adaptor part is manually operated without incurring damage to the one-way clutch components.

In one embodiment of the present invention, the one-way clutch includes a clutch wheel concentrically arranged about an end of the worm shaft, a hex wheel concentrically arranged on the worm shaft adjacent to the clutch wheel and engaging the worm shaft in a non-rotating manner, and a power spring arranged to press the clutch wheel into non-rotating contact with the hex wheel with sufficient force that during a brake application event, the clutch wheel and the hex wheel do not rotate relative to one another. The one-way clutch is also provided with a mechanism which facilitates retraction of the brake linings without damage to the one-way clutch during manual operation of the external extension. In this embodiment, the clutch wheel and the hex wheel are provided with a ball detent clutch arrangement between their respective contact faces, arranged such that when a predetermined torque applied to the external extension is exceeded, the ball detent clutch elements overcome the pressure applied by the power spring, pushing the clutch wheel and the hex wheel axially apart and permitting the hex wheel to rotate the brake lining-retraction direction on the balls of the ball detent clutch, independent from the non-rotating clutch wheel. Preferably, the predetermined torque which must be exceeded by the manual actuation of the external extension is a torque which is higher that that normally observed between the clutch wheel and the hex wheel during brake application operations. This ensures that the ball detent clutch does not permit the clutch wheel and the hex wheel to move relative to one another during normal brake application events.

A ball detent clutch includes a series of balls arrayed in a pattern such as a circle, located between two parallel members. When at rest, the balls reside in detents on at least one of the parallel members. A normal force (provided, for example, by a spring) is applied to bias the parallel members toward one another. If a torque is applied to one of the parallel members to rotate the members, the torque is transferred through the balls to the opposing the parallel member. The strength of the spring biasing the parallel surfaces toward one another governs how much torque may be applied before, at a predetermined torque, the tangential force on the balls cause the balls to push apart the parallel members and allow the parallel members to begin to rotate relative to one another. In one type of ball detent clutch, the balls reside in recesses or holes in one of the parallel members, with a portion of each ball extending above the surface of the face of the member so that they can engage corresponding detents in the opposite parallel member, and when the predetermined torque is exceeded, the balls rise out of the detents on the surface of the opposite member and permit the parallel members to move relative to one another while the balls rotate in place within their respective recesses or holes. Once the predetermined torque is exceeded, torque is no longer transferred from one parallel member to the opposing member, i.e., the clutch is released.

Other objects, advantages and novel features of the present invention will become apparent from the following detailed description of the invention when considered in conjunction with the accompanying drawings.

DETAILED DESCRIPTION OF THE DRAWINGS

Figure 5:
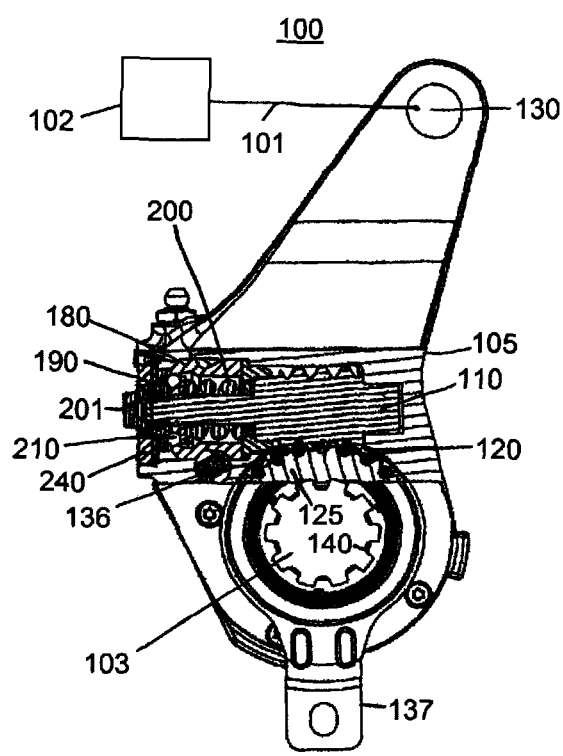
FIG. 5 is a partial cut-away view of an automatic slack adjuster in accordance with an embodiment of the present invention.

FIG. 5 is partial cut-away view of a clearance-sensing automatic slack adjuster 100. The automatic slack adjuster 100 has a housing 105 containing a main gear set comprising a worm shaft 110 meshing with a worm gear 120, a brake actuator pushrod receiving hole 130 for coupling the automatic slack adjuster 100 to a brake actuator pushrod 101 (schematically illustrated with brake actuator 102), and a splined coupling 140 either integrally formed with or otherwise coupled to the worm gear 120 to receive an end of a brake camshaft 103 (splined end of the brake cam illustrated inside splined coupling 140).

Concentrically located adjacent to worm gear 120 is a reference wheel 125 used to perform automatic adjustments of brake lining clearance. Reference wheel 125 is held on an inner circumferential surface by a plurality of one-way toothed pawls (not illustrated) against rotation relative to stationary reference arm 137 in one direction when the automatic slack adjuster is moved, and is free to move in the other direction as it ratchets over the pawls.

The reference wheel 125 meshes with adjustment wheel (not illustrated), which through a worm shaft extension 136 drives a control worm wheel 180 which is concentrically located on an end of worm shaft 110. The control worm wheel 180 is coupled to an output wheel 190, which is keyed to the worm shaft 110 by a polygon section (those of skill in the art will recognize that alternate features, such as a roll pin or other such component, would be sufficient to preclude rotation of the output wheel 190 relative to the worm shaft 110). The control worm wheel 180 and the output wheel 190 biased toward one another by a power spring 200. Interposed between the control worm wheel 180 and the output wheel 190 are the balls 210 of a ball detent clutch, where the opposing faces of the control worm wheel 180 and output wheel 190 form the races upon which the balls 210 roll when displaced out of detents 240 in the opposing faces. An external adaptor part 201 coupled to the output wheel 190 is provided for manual rotation of the worm gear, for example when retraction of the brake linings is desired. In this embodiment, the adaptor part 201 is formed as a circular plate, with an external hex-shaped projection suitable for turning by a wrench.

Figure 1:
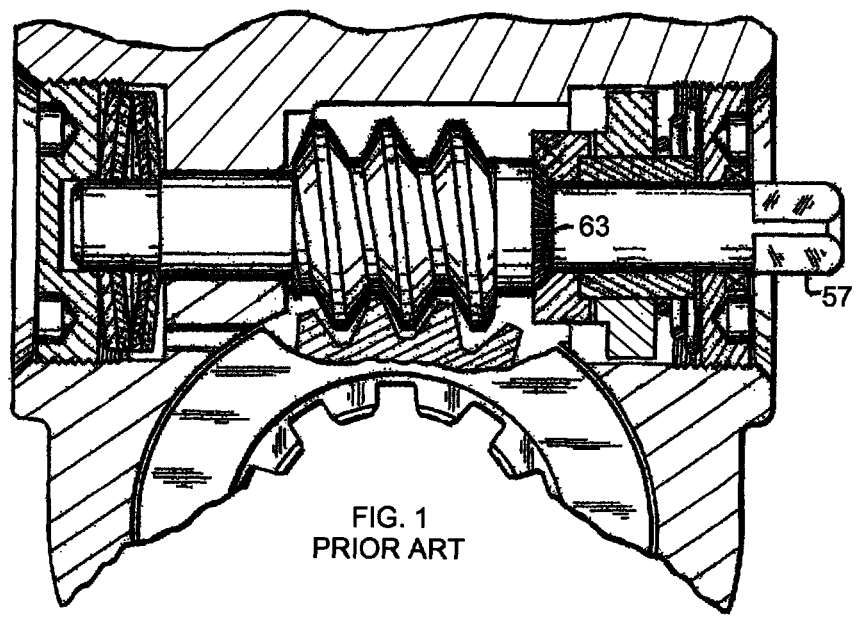
FIGS. 1-3 are views of prior art slack adjuster worm gear and one-way adjustment clutch arrangements.
Figure 2:
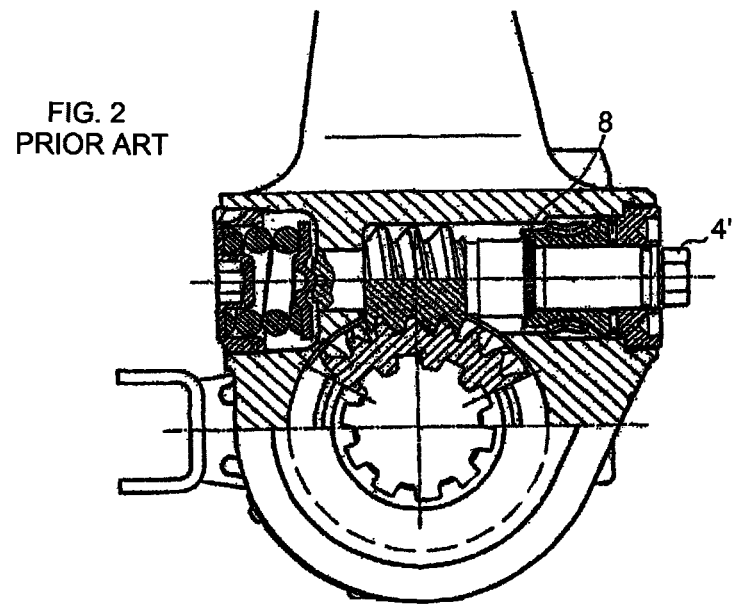
Figure 4A:
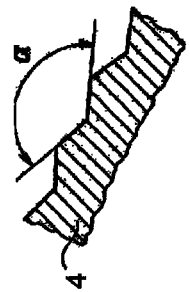
FIGS. 4a-4b are views of prior art slack adjuster clutch teeth.
Figure 4B:
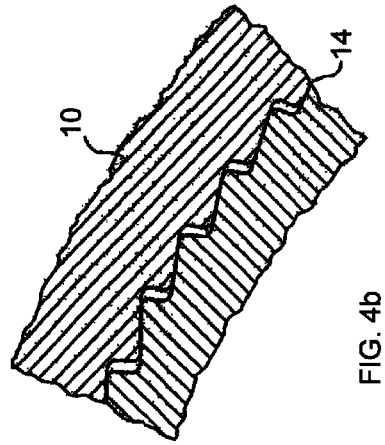
Figure 3:
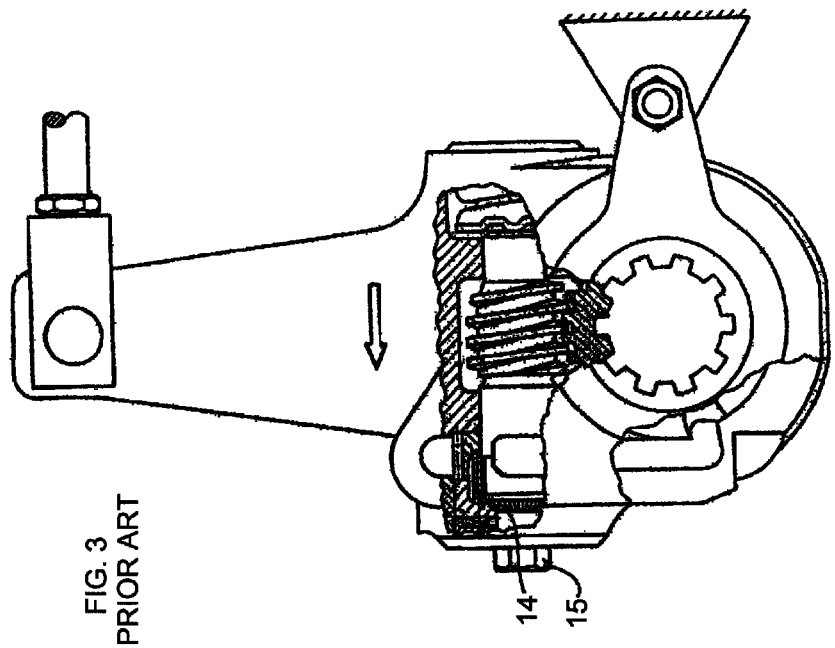
Figure 6:
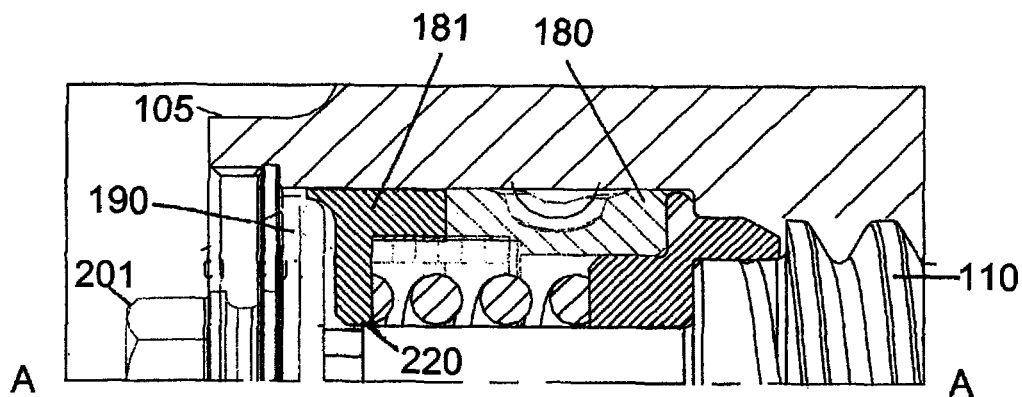
FIGS. 6-7 are enlarged views of adjuster components, with the upper half of a friction clutch illustrated in FIG. 6, and the lower half of the ball detent clutch of FIG. 5 illustrated in FIG. 7.
Figure 7:
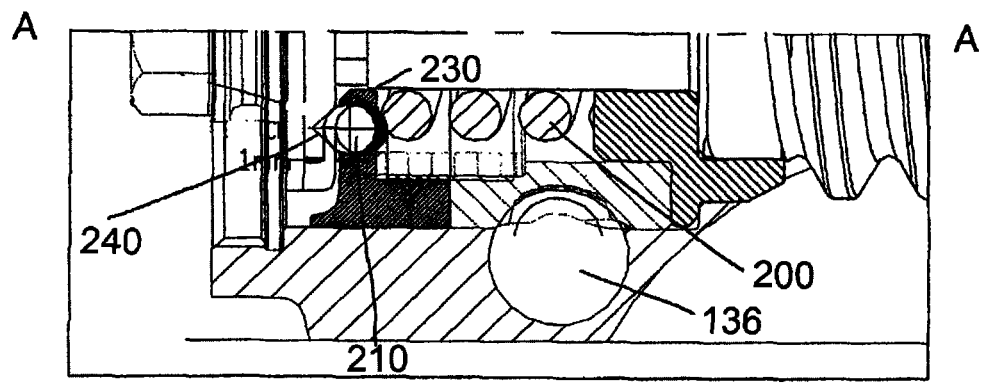

FIGS. 6-7 show a detailed cross-section view of two embodiments of a clutch, including in FIG. 6 the top half, above the worm shaft centerline A-A, of a conventional friction cone clutch 220, and in FIG. 7 the half below the worm shaft centerline A-A, the ball detent clutch 230 of FIG. 4. In both embodiments, power spring 200 biases control worm wheel 180 (the input part) against output wheel 190 (the output part) (here, control worm wheel 180 also has an end portion 181 which provides the contact surface).

In the upper friction cone embodiment 220, there is no means present for releasing the friction cone engagement when a technician applies a brake lining retraction torque to the adaptor part. Thus, in order to overcome the friction force generated by the power spring 200 to rotate the worm gear in the brake lining release direction, the technician must apply a large torque to the adaptor part (and hence, the output wheel 190, resulting in damage to the opposing mating surfaces of the control worm wheel 180 and the output wheel 190. The damage caused by the sliding of these components' friction surfaces across one another deforms the surfaces, thereby reducing the torque capacity of the clutch and hastening the need for repair and/or replacement. Similar damage and loose of capacity occurs with alternative clutches, as well, such as when conical toothed clutches are used, and their teeth are deformed when a technician applies enough torque to overcome the engagement of the opposing clutch teeth.

In contrast, in the lower ball detent clutch embodiment 230, damage is avoided by the plurality of balls 210 (a single ball illustrated in the FIG. 7 cross-section view) interposed between the opposing faces of control worm wheel 180 and output wheel 190. In this embodiment, the ball 210 is located in a recess in control worm wheel end portion 181, with enough of the ball 210 extending beyond the face of end portion 181 (here, by approximately 1 mm) to engage a detent 240 in the face of output wheel 190. During normal brake application operations, the power spring 200 biases the two wheels toward one another with sufficient axial force to ensure that, as control worm wheel 180 is rotated by adjustment wheel 135 and worm shaft extension 136, the output wheel 190 is driven by the balls 210 acting transversely on the detents 240. The force generated by the power spring 200 is selected, however, to not be so high as to prevent the ball detent clutch from releasing the output wheel 190 when manual operation to retract the brake linings is desired.

When a technician applies a torque to the external adaptor part 201 to withdraw the brake linings, no significant motion occurs until the applied torque exceeds a predetermined value. The predetermined torque value in turn is determined by the predetermined amount of force generated by power spring 200. When the applied torque exceeds the predetermined value, the balls 210 are cammed up out of the detents 240, moving axially as the balls 210 rise out of the detents 240. In order to move axially, either the balls move axially deeper into their recesses in end portion 180, or the balls' axial motion is transferred to the control worm wheel, overcoming the force of the power spring. When the balls 210 are out of the detents 240, the output wheel 190 is free to be driven by the external adaptor part 201 to rotate relative to the control worm wheel 180 at a considerably lower torque level, and without any opposing face interaction or consequent damage. Accordingly, because the worm shaft 110 is non-rotatably coupled to the output wheel 190, the technician may rotate the external adaptor part 201 with low resistance to rotate the worm shaft 110, thereby retracting the brake linings without damage to the automatic slack adjuster. Thus, the present invention provides an automatic slack adjuster with a greatly enhanced service life and resistance to long-term degradation of the torque capacity of its adjustment mechanism.

In addition to the reduction in internal damage to the automatic slack adjuster provided by the ball detent clutch arrangements of the present invention, the present invention also lowers automatic slack adjuster initial manufacture cost and long-term servicing costs by eliminating the need for expensive specialty lubricants previously required to help minimize friction and thus ensure adjustment.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

What is claimed is:

1. An automatic slack adjuster for a vehicle brake, comprising:
    a housing configured to be coupled to a brake actuator for applying a brake actuating force to the vehicle brake;
    a worm gear set carried by the housing, the worm gear set including a worm gear and a worm shaft, wherein
        the worm gear is arranged to engage a brake cam shaft of the vehicle brake, and
        the worm shaft is arranged to transfer the brake actuating force from the housing to the worm gear;
    an adjustment mechanism having an input part and an output part, the input part being concentrically disposed about an end of the worm shaft and the output part being non-rotatably coupled to the worm shaft, the adjustment mechanism further having a ball detent clutch disposed between the input part and the output part to transfer up to a predetermined amount of torque between the input part and the output part; and
    an adaptor part carried by the housing and having an externally-accessible operating feature coupled to the output part,
    wherein the ball detent clutch is configured to operate without relative motion between the input part and the output part in an axial direction when the predetermined amount of torque is exceeded.

2. The automatic slack adjuster of claim 1, wherein
    when the adaptor part is operated in a brake release direction with a torque greater than the predetermined amount of torque, the output part is disengaged from the input part and the adaptor part begins to rotate.

3. The automatic slack adjuster of claim 2, wherein
    when the adaptor part rotates in the brake release direction, the adaptor part rotates the output part and the worm shaft in the brake release direction.

4. A vehicle brake, comprising:
    a brake actuator having a brake actuation pushrod;
    brake camshaft arranged such that rotation of the brake camshaft about a longitudinal axis actuates the brake; and
    an automatic slack adjuster coupled between the brake actuator pushrod and the brake camshaft to transfer a brake actuating force from the pushrod to rotate the brake camshaft, the automatic slack adjuster comprising:
        a housing, the housing coupled to the brake actuator;
        a worm gear set carried by the housing, the worm gear set including a worm gear and a worm shaft, wherein
            the worm gear is arranged to engage the brake camshaft, and
            the worm shaft is arranged to transfer the brake actuating force from the housing to the worm gear;
        an adjustment mechanism having an input part and an output part, the input part being concentrically disposed about an end of the worm shaft and the output part being non-rotatably coupled to the worm shaft, the adjustment mechanism further having a ball detent clutch disposed between the input part and the output part to transfer up to a predetermined amount of torque between the input part and the output part; and
        an adaptor part carried by the housing and having an externally-accessible operating feature coupled to the output part,
        wherein the ball detent clutch is configured to operate without relative motion between the input part and the output part in an axial direction when the predetermined amount of torque is exceeded.

5. The vehicle brake of claim 4, wherein
    when the adaptor part is operated in a brake release direction with a torque greater than the predetermined amount of torque, the output part is disengaged from the input part and the adaptor part begins to rotate.

6. The vehicle brake of claim 5, wherein
    when the adaptor part rotates in the brake release direction, the adaptor part rotates the output part and the worm shaft in the brake release direction.

7. An automatic slack adjuster for a vehicle brake, comprising:
- a housing configured to be coupled to a brake actuator for applying a brake actuating force to the vehicle brake;
- means for transferring the brake actuating force applied to the housing to brake cam shaft of the vehicle brake, wherein the means for transferring the brake actuating force includes
  - a slack adjusting mechanism which allows the housing to move relative to the brake cam shaft so as to reduce slack from the vehicle brake, and
  - an adjustment mechanism which, when engaged, permits the means for transferring to move in a first direction to accommodate excessive slack and prevents the movement in a second direction opposite the first direction; and
- means for actuating a ball detent clutch mechanism, the means for actuating being carried by the housing and having an externally-accessible operating feature, wherein
  - when the means for actuating is operated the means for transferring the brake actuating force is moved in a brake release direction, and
  - the ball detent clutch mechanism is configured to operate without relative motion between the input part and the output part in an axial direction when the predetermined amount of torque is exceeded.

8. A method of releasing a vehicle brake having an automatic slack adjuster, comprising:
- providing the automatic slack adjuster between a brake actuator for applying a brake actuating force and a brake cam shaft of the vehicle brake, the automatic slack adjuster including
  - a housing configured to be coupled to the brake actuator to receive the brake actuating force;
  - a worm gear set carried by the housing, the worm gear set including a worm gear and a worm shaft, wherein the worm gear is arranged to engage the brake cam shaft of the vehicle brake, and the worm shaft is arranged to transfer the brake actuating force from the housing to the worm gear;
  - an adjustment mechanism having an input part and an output part, the input part being concentrically disposed about an end of the worm shaft and the output part being non-rotatably coupled to the worm shaft, the adjustment mechanism further having a ball detent clutch disposed between the input part and the output part to transfer up to a predetermined amount of torque between the input part and the output part; and
  - an adaptor part carried by the housing and having an externally-accessible operating feature coupled to the output part,
- operating the adaptor part in a brake release direction, wherein
  - when the adaptor part is operated in a brake release direction with a torque greater than the predetermined amount of torque, the output part is disengaged from the input part and the adaptor part begins to rotate, and the adaptor part rotates the output part and the worm shaft in the brake release direction, and
  - the ball detent clutch is configured to operate without relative motion between the input part and the output part in an axial direction when the predetermined amount of torque is exceeded.

* * * * *